Figure 1:
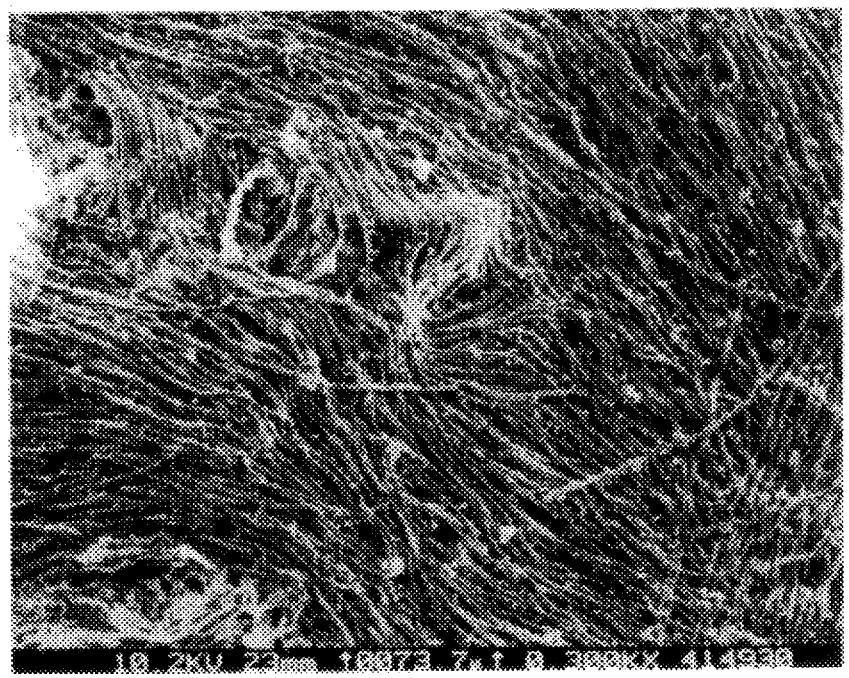

United States Patent [19]

Ibeanusi

[11] Patent Number: 5,736,048
[45] Date of Patent: Apr. 7, 1998

[54] BIOLOGICAL PROCESS OF REMEDIATING CHEMICAL CONTAMINATION OF A POND

[75] Inventor: Victor M. Ibeanusi, Decatur, Ga.

[73] Assignee: Spelman College, Atlanta, Ga.

[21] Appl. No.: 690,455

[22] Filed: Aug. 2, 1996

Related U.S. Application Data

[63] Continuation of Ser. No. 449,102, May 24, 1995, abandoned.

[51] Int. Cl.$^6$ .................................. C02F 3/32; C02F 3/34
[52] U.S. Cl. ........................ 210/602; 210/611; 210/615; 210/747; 210/909; 210/912; 210/913; 435/262.5; 435/834; 435/946
[58] Field of Search ..................... 210/602, 610, 210/611, 615, 620, 747, 909, 912, 913, 914; 435/262, 262.5, 264, 834, 946

[56] References Cited

U.S. PATENT DOCUMENTS

| | | | |
|---|---|---|---|
| 2,867,945 | 1/1959 | Gotaas et al. | 47/58 |
| 3,376,219 | 4/1968 | Silvey | 210/11 |
| 4,005,546 | 2/1977 | Oswald | 210/602 |
| 4,086,161 | 4/1978 | Burton | 210/602 |
| 4,165,281 | 8/1979 | Kuriyama et al. | 210/150 |
| 4,333,263 | 6/1982 | Adey | 47/1.4 |
| 4,670,149 | 6/1987 | Francis | 210/150 |
| 5,011,602 | 4/1991 | Totani et al. | 210/242.1 |
| 5,011,604 | 4/1991 | Witde et al. | 210/747 |
| 5,039,414 | 8/1991 | Mueller et al. | 210/610 |
| 5,096,577 | 3/1992 | Ngo et al. | 210/151 |
| 5,387,343 | 2/1995 | Iuni et al. | 210/611 |
| 5,411,664 | 5/1995 | Geech et al. | 210/610 |
| 5,522,985 | 6/1996 | Bender et al. | 210/150 |

FOREIGN PATENT DOCUMENTS

| | | |
|---|---|---|
| 2357735 | 6/1974 | Germany . |
| 62-282697 | 12/1987 | Japan . |
| 283093 | 3/1990 | Japan . |
| 234244 | 4/1977 | U.S.S.R. . |
| 912683 | 3/1982 | U.S.S.R. . |

OTHER PUBLICATIONS

Bender, J.A., et al., "Uptake, Transformation and Fixation of Se(VI) by a Mixed Selenium–Tolerant Ecosystem," Water, Air and Soil Pollution, vol. 59, pp. 359–367 (1991).

Ekpo, I., et al., "Digestibility of a Commercial Fish Feed, Wet Algae and Dried Algae by Tilapia nilotica and Silver Carp," The Progressive Fish–Culterist, vol. 51, pp. 83–86 (1989).

Brawley, J.P., Ph.D., Reclamation of Metals from Water with a Silage–Microbe Ecosystem (Mar. 1991).

Bender, J.A., et al., "Fish Feeds from Grass Clippings," Aquacltural Engineering, vol. 8, pp. 1–13 (1989).

Cerniglia, C.E., et al., "Oxidation of Naphthalene by Cyanobacteria and Microalgae, J. of Gen. Microb., vol. 116, pp. 495–500 (1980).

Bauer, J.E., et al., "Degradation and Mineralization of the Polycyclic Aromatic Hydrocarbons Anthracene and Naphthalene in Intertidal Marine Sendiments," Applied and Environ. Microb., pp. 81–90 (1985).

Bender, J.A., et al., "Lead Removal from Contaminated Water by a Mixed Microbial Ecosystem," Wat. Sci. Tech., vol. 21, pp. 1661–1664 (1989).

(List continued on next page.)

Primary Examiner—Christopher Upton
Attorney, Agent, or Firm—Fitzpatrick, Cella, Harper & Scinto

[57] ABSTRACT

In a process of remediating chemical contamination of a pond contaminated with one or more toxic heavy metals or aromatic compounds, the steps include: preparing a silage of grass clippings, placing the silage on the surface of a pond, and inoculating the pond with an alga and *Bacillus cereus* in sufficient quantities to cause a mixed algal and bacterial bloom to form on the pond surface and become annealed to the silage, leaving the silage with the annealed bloom on the surface of the pond for a sufficient amount of time to allow the bloom to withdraw at least some of the toxic heavy metal content or to degrade at least some of the aromatic compound content of the pond, and removing the silage with the annealed bloom from the pond.

21 Claims, 1 Drawing Sheet

OTHER PUBLICATIONS

Archibold, E.R., et al., "Use of Mixed Microbial System in the Removal of lead from Contaminated Water", Biodeterioration Reserch 2, pp. 161–174, Plenum Press (1989).

Stal, L.J., et al., "Structure and Development of a Benthic Marine Microbial Mat", 31 FEMS Microbiology Ecology 111–25 (1985).

Jørgensen, B.B., et al., "Competition for Sulfide Among Colorless and Purple Sulfur Bacteria in Cyanobacterial Mats", 38 FEMS Microbiology Ecology 179–86 (1986).

Wimpenny, J., "Chapter 33: Laboratory Model Systems for the Experimental Investigation of Gradient Communities", pp. 366–383 in Cohen, Y., et al., eds., Microbial Mats: Physiological Ecology of Benthic Microbial Communities, American Society for Microbiolgy (1989).

Ibeanusi, V.M., et al., "Chromate Reduction and Removal in Simulated Pond Systems," Proceedings of the IASTED International Symposium on World Environment, pp. 140–142 (Apr. 1991).

Bender, J., et al., "Effects of Supplements on the Bioaccumulation of Lead in Anabaena spp.," Bull. Environ. Toxicol., vol. 39, pp. 209–213 (1987).

Jørgensen, B.B., et al., "Photosynthetic Action Spectra and Adaptation to Spectral Light Distribution in a Benthic Cyanobacterial Mat," Applied and Environmental Microbiology, pp. 879–886 (Apr. 1987).

D'Amelio, E.D., et al., "Association of a new type of gliding, filamentous, purple phototrophic bacterium inside bundles of *Microcoleus chthonoplastes* in hypersaline cyanobacterial mats," Arch. Microbiol., vol. 147, pp. 213–220 (1987).

Skyring, G.W., et al., "Acetylene Reduction and Hydrogen Metabolism by a Cyanobacterial/Sulfate–Reducing Bacterial Mat Ecosystem," Geomicro–biology Journal, vol. 6, pp. 25–30 (1988).

Jørgensen, B.B., et al., "Optical properties of benthic photosynthetic communities: Fiber–optic studies of cyanobacterial mats," Limnol. Oceanogr., vol. 33(1), pp. 99–113 (1988).

BIOLOGICAL PROCESS OF REMEDIATING CHEMICAL CONTAMINATION OF A POND

This application is a continuation of application Ser. No. 08/449,102, filed May 24, 1995, now abandoned.

BACKGROUND OF THE INVENTION

Field of the Invention

This invention relates to a biological process of remediating chemical contamination of a pond that is contaminated with either heavy metals or aromatic compounds, or both.

Many chemically contaminated ponds are contaminated with a mixture of one or more toxic heavy metals and one or more aromatic compounds. Petroleum-derived contamination often is of this type. Most petroleum-derived contamination includes both trace heavy metals and aromatic compounds. Processes of cleaning up contaminated ponds are often time-consuming and expensive. Sometimes draining and treatment of the water is required. Sometimes dredging and incineration of the soil is required. There is a need for a simpler method of remediating the contamination in such ponds.

SUMMARY OF THE INVENTION

I have found that a pond that is contaminated with one or more toxic heavy metals or one or more aromatic compounds, or both, can have its contamination remediated by a process comprising the following steps:

a) preparing a silage of grass clippings;

b) placing the silage on the surface of the pond and inoculating the pond with an alga and *Bacillus cereus*, using sufficient amounts of said alga and *Bacillus cereus* to cause a mixed algal and bacterial bloom to form on the pond surface and become annealed to the silage;

c) leaving said silage with annealed bloom on the surface of the pond for a time sufficient to allow the bloom to sequester at least some of the toxic heavy metals in the pond or for a time sufficient to allow the microorganisms in the bloom to degrade at least some of the aromatic compounds in the pond; and d) then removing said silage with annealed bloom from the pond.

At some sites this process alone may provide sufficient remediation of the chemical contamination. It can, of course, be performed on the pond more than once.

BRIEF DESCRIPTION OF THE DRAWINGS

FIG. 1 of the attached drawings shows a scanning electron micrograph of a 15-day sample of a silage and annealed bloom biomass. FIG. 2 shows a micrograph of a 30-day sample of a silage and annealed bloom biomass. The micrographs show a structural organization created by the network of the silage, *Bacillus cereus*, and blue-green algae that is intact and substantially free of mold.

DETAILED DESCRIPTION OF THE INVENTION

Although not wishing to be bound by theory, I believe that the process works by motile *Bacillus cereus* bacteria mobilizing the heavy metal to the bacterial bloom that is annealed to the layer of floating grass clippings. Aromatic compounds in the pond water or soil are similarly broken down by the mixed microbial ecosystem into comparatively harmless derivatives such as carbon dioxide, bicarbonates, water, and aliphatic organic compounds such as aliphatic carboxylic acids, e.g., lactic acid. The membrane structure of the algae in the annealed bloom apparently serves to sequester the heavy metal compounds delivered by the bacteria. The silage provides not only a physical structure for holding the biomass, but supplies important nutrients as well. The mixed microbial ecosystem generates oxygen and other gases during the clean-up process which, it is believed, helps keep the microbial biomass buoyant.

Preparing the Silage

The silage is preferably prepared from a mixture of grasses, for example Bermuda grass and Kentucky fescue. It may be beneficial to include other wild grasses as well.

I have found it advantageous to also include sugar cane stalk with the grass. It seems to enhance and stimulate the silaging process. The stalk is preferably cut when it is ripe—i.e., its sugar content is fully developed. Also, it is preferably broken or shredded to increase its effective surface area.

Clostridia bacteria usually are present in grass cuttings. In the silaging process, the Clostridia bacteria produce butyric acid, which tends to cause spoilage of the grass. It is believed that the sugar cane helps to increase the pH of the system to a point at which the Clostridia bacteria do not thrive. Also, the sugar cane seems to inhibit undesired fungal growth.

To prepare the silage, the grass clippings (preferably with sugar cane stalk) are stored in a substantially anaerobic environment to allow the microbes normally present in the grass, for example, *Lactobacillus curvatis, L. plantarum,* and Clostridia bacteria, to reproduce and metabolize the grass. This is continued until there is a rich mixture of different metabolites in the grass clippings, including, for example, lactic acid, propionic acid, and/or acetic acid. These metabolites will provide nutrition, including a carbon source, for the *Bacillus cereus*. Generally this will require storage for a period of at least about two weeks at a temperature in the range of about 25° to 30° C. The higher the silaging temperature, the shorter the period, in general. The silaging process should be halted before the grass (and sugar cane, if present) lose so much of their structural integrity that they will not be able to support the microbial bloom on the pond's surface for a long enough period of time to remediate the contamination. Usually, the silaging time will be about 2 to 4 weeks.

To halt or slow down the silaging process after the grass clippings have reached the point where they contain a rich mixture of metabolites that will furnish nourishment for the *Bacillus cereus,* the silage mixture can be cooled, for example, to a temperature at or below about 4° C., but above freezing. This can be accomplished, for example, by moving the silage to a cold room. Alternatively, the storage container (the silo) can be equipped with cooling coils, which can be activated at the appropriate time, so as to sufficiently drop the temperature of the contents to substantially stop the silaging.

In a preferred embodiment, the silage composition spread on the pond surface is a mixture of grass clipping silages that have been ensilaged for different lengths of time. Preferably, it will be two or more (e.g., 2 to 5) different silages, and at least two of them will have undergone ensilaging times that differ by at least about 3 or 4 days. For example, a mixture of at least four different ensilages can be used: one that had been stored for about 8 to 12 days before chilling, a second that had been stored for about 13 to 17 days, a third that had been stored for about 18 to 22 days, and a fourth that had undergone the ensilaging process for about 25 to 35 days before having its temperature lowered. These mixed-storage-time silage compositions generally provide enhanced nutritional support for the bacteria and algae. It is believed that this is due to the presence in them of a more varied mixture of metabolites than is provided by a single-storage-time silage composition.

Selection of the Alga

Some algae are photosynthetic, but not nitrogen-fixing. Other algae are nitrogen-fixing but not photosynthetic. Preferably the alga or algae used to inoculate the pond in the process of the present invention is both photosynthetic and nitrogen-fixing. Thus, a mixture of at least one photosynthetic strain and at least one nitrogen-fixing strain can be used. Preferred algae are of the phylum Cyanophyta, e.g., blue-green algae.

Selecting the *Bacillus Cereus*

The *Bacillus cereus* used to inoculate the pond can be obtained from a culture depository, or it can be a strain of *Bacillus cereus* already present in the pond. Using methods well known in the art, the pond water can be analyzed for *Bacillus cereus* content, and if that bacterium is found in the water, it can be isolated and cultured in a laboratory to prepare the inoculant. Usually there will be a mixture of natural strains of *Bacillus cereus* in the pond water. Preferably these will be cultured in the laboratory in a medium containing one or more of the toxic heavy metals known to contaminate the pond. Some of the strains may survive and grow better on the media than others. Those are preferred for use in the process of the present invention, since they are more resistant to the heavy metal contaminant or contaminants.

Strains of *Bacillus cereus* that are heavily ciliated are believed to be preferred. These are the most motile in water and, it is believed, are best able, after mobilizing heavy metal contaminants in the soil at the bottom of the pond or water column, to migrate to the nutrient-rich silage on the surface.

The amount of algal and bacterial inoculants used is enough to cause a mixed algal and bacterial bloom to form on the pond's surface and become annealed to the silage. Usually the bacterial bloom will appear first. Preferably, enough *Bacillus cereus* inoculant will be used to cause that bacterial bloom to form within about 24 hours after inoculation. Also preferred is that enough algal inoculant be used to cause an algal bloom to form within about 2 to 10 days after inoculation. The bacterial and algal blooms will be entwined, of course, and enmeshed with the silage.

In addition to the *Bacillus cereus,* other chemolithotropic bacteria resident in the pond may assist with the detoxification process. As examples of such bacteria may be mentioned *Bacillus thuringiensis* and *Bacillus pantothenticus.*

Preferably enough silage is placed on top of the pond substantially cover the pond's surface. Preferably the silage layer, when first applied, will have a thickness in the range of about 0.1 to 0.5 inch. It also is preferred that the silage be placed on the pond before the pond is inoculated with the algae or bacteria.

The algae and bacteria inoculants may be injected randomly into the pond. In general, it is preferred to inoculate with the bacteria last, as it appears that the initial stress condition (for the bacteria) that is created by the presence of the contaminants is cushioned or minimized somewhat by the initial inoculation with the algae. Often it is preferred to wait at least about ten minutes after the algae inoculation before adding the bacterial inoculant.

The silage with annealed bloom is left on the surface of the pond for a time sufficient to allow the bloom to mobilize and sequester at least some of the toxic heavy metals in the pond, or for a time sufficient to allow the microorganisms in the bloom to degrade at least some of the aromatic compounds in the pond. Usually it will be preferred to leave the silage on the pond for at least about 14 days.

The bacterial bloom preferably reaches a population level of at least about $10^3$ cells/ml. before it and the silage are removed from the pond. Cell counts below this may not be sufficient to move a significant quantity of metal-containing bacteria to the biomass on the pond's surface. Also, the redox level of the pond water will advantageously be in the range of about 250 to 333 mV at time of silage and biomass removal, so as to reach enhanced mobilization of the metal ions, with the higher end of that range being generally preferred.

The complex of microbial biomass and silage should be skimmed off the surface of the pond before it loses its buoyancy. Generally, it will be preferred to remove the silage within about 30 days after being placed on the pond. The metabolic activities of the microbes in the bloom annealed to the grass clippings generate oxygen and other gases. The microbial biomass appears to lose buoyancy as less gas is generated.

The removed silage, with the mixed microbial biomass annealed to it, can then be disposed of in a conventional manner for waste that contains toxic heavy metals, for example, by incineration in an approved facility, followed by proper disposal, e.g., in a licensed landfill, of the metal-containing ash. Alternatively, the detoxified metal ions can be recovered from the biomass-silage complex for re-use. This recycling process can save or reduce production costs for industry.

Ponds that may be treated by the bioremedial process of the present invention include those which are contaminated by one or more metals that are on the U.S. Environmental Protection Agency's National Priority Listing. Included are ponds contaminated with one or more metals selected from the group consisting of arsenic, hexavalent chromium, lead, selenium, and cadmium. The process is especially useful for detoxification of ponds that are contaminated with conglomerate heavy metals—i.e., a mixture of two or more heavy metals.

Coal mine ponds are one type that can be treated by the process of the present invention. They are often contaminated with heavy metals, particularly lead, and contain high levels of sulfur.

Contaminated ponds that contain sulfate ion are especially suitable for the bioremediation treatment of the present invention. Usually sulfate ions tend to inhibit the growth of aerobic bacteria. *Bacillus cereus,* however, can reduce the sulfate to sulfide, which associates with heavy metal ions such as lead, cadmium, zinc, and copper, to form a substantially water-insoluble precipitate, which collects in the biomass and can be readily removed from the pond's surface.

Among the aromatic compound contaminants that can be removed by the process of the present invention are aromatic hydrocarbons and derivatives thereof, e.g., aromatic hydrocarbons in which one or more ring hydrogens has been replaced by a halogen, methyl or nitro group. Examples of such include chlorobenzene, toluene, and nitrobenzene. It is believed that the mixed microbial ecosystem of the present process generates enzymes that cleave substituents off the benzene ring in substituted aromatic compounds, open the ring, and break the compounds down by oxidation into carbon dioxide, bicarbonates, water, and aliphatic carboxylic acids.

The process of the present invention preferably generates a pH in the pond within the range of about 4.5 to 8.9. This is the appropriate chemical environment for precipitation of most heavy metals from solution in the pond water, such as $Pb^{2+}$, $Cr^{3+}$, $As(V)$, $Cd^{2+}$, and $Se^{\circ}$. As a result, effective attachment of the metals to the floating microbial biomass is achieved. In contrast thereto, at a pH below about 4 or above about 9.5 the metal speciation equilibrium changes, such that the metals are driven back into solution.

EXAMPLE I

A mixture of grass clippings (Bermuda grass and Kentucky fescue) and ripe sugar cane stalk, all in pieces ranging from 1 to 2 inches in length, was tightly packed into 2-liter jars, at least 30 grams to a jar. Four of the jars were allowed to ensilage at room temperature for 10, 15, 20, and 30 days, respectively. At the end of its ensilage period, each jar was stored in a refrigerator at 4° C.

An equal parts mixture of the four different silage compositions was used to attempt to remediate heavy metal contamination in a laboratory-simulated pond. The pond contained Georgia red clay soil, water extracted from the silage, and a conglomeration of 5 ppm arsenic, 100 ppm hexavalent chromium, and 100 ppm lead. The arsenic was supplied as arsenite, $AsO_3$. The hexavalent chromium was supplied as potassium dichromate. The lead was supplied in the form of lead nitrate.

The simulated pond had a volume of 3.5 liters and was held in a plastic container. The surface area of the pond was 27.5 square inches.

On the surface of the simulated pond was floated 3.3 grams of the silage per liter of pond water. This created a silage mat approximately 0.1–0.5 inch thick. Then a small quantity (in the range of 6.2 to 10 ml.) of a culture broth of blue-green algae was sprinkled over the silage. The broth had been prepared with brackish water. The algae had been isolated from a soil sample from Georgia, and adapted for use in the process by culturing it in ever-increasing concentrations of various aromatic compounds and toxic heavy metals, until the maximum tolerable concentration was found. No attempt was made to use an axenic (pure) culture of the algae because of the inherent difficulties in doing so. Therefore, the algae included both heterocyst-forming and non-heterocyst-forming strains. In other words, it included both photosynthetic strains (which were predominant) and nitrogen-fixing strains.

Next the *Bacillus cereus* (Strain MRS-1, ATCC accession number 55673, samples received at ATCC on May 19, 1995) was added. Five (5) ml. of a *Bacillus cereus* culture broth having a cell count in the range of about $3 \times 10^6$ to $10 \times 10^6$ per ml. was delivered by pipette directly to the water column. The broth also contained minor amounts of *Bacillus thuringiensis* (Strain MRS-2, ATCC accession number 55674, samples received at ATCC on May 19, 1995) and, based on a fatty acid analysis, *Bacillus pantothenticus* as well. (No pure isolate of the latter was obtained.) The mixed culture was isolated from a soil sample from Georgia. It was adapted for use in the process by the same serial adaptation procedure as used for the algae.

The inoculated pond was placed in an environmental chamber, lighted by three 75-watt incandescent light bulbs for 12 hours a day. On the surface of the pond, a bacterial bloom was evident within approximately 10–24 hours after inoculation. An algal bloom appeared subsequently, about 36–48 hours after inoculation. By about Day No. 7, the *Bacillus cereus* and the blue-green algae had become annealed to the silage at the surface of the pond.

The volume of the pond was kept relatively constant by the addition of tap water. The levels of the arsenic, hexavalent chromium, and lead in the water column of the pond, together with the pH of the water, were monitored daily for 7 days. The experiment was run in triplicate. Table 1 shows the averaged results, which indicate that the metals were rapidly mobilized, and then sequestered from the water column with the ultimate deposition of the ions in the surface biomass. Analysis of the biomass revealed that 80%, 90%, and 87% of the As, Cr, and Pb ions, respectively, were sequestered to the biomass by the end of Day 7. Infra-red spectroscopy analysis of spent media of cultures of the biomass and arsenic revealed that the arsenic (supplied in trivalent form, as arsenite) was oxidized to As(V) as monomethylarsenate ($CH_3AsO_2OH^-$).

TABLE 1

THE SEQUESTERING OF CONGLOMERATE METAL IONS OF As, Cr (VI) AND Pb

| Culture period, | Metal concentration in water column, mg/l | | | |
|---|---|---|---|---|
| days | As | Cr (VI) | Pb | pH levels |
| 0 | 5.0 | 100.0 | 100.0 | 4.3 |
| 1 | 3.6 | 78.2 | 56.3 | 4.6 |
| 2 | 1.5 | 65.3 | 39.4 | 5.3 |
| 3 | 0.5 | 46.3 | 24.3 | 6.3 |
| 4 | ND | 15.4 | 17.3 | 7.3 |
| 5 | ND | 6.4 | 8.2 | 8.6 |
| 6 | ND | ND | 6.7 | 8.9 |
| 7 | ND | ND | ND | 8.9 |

ND = not detected

EXAMPLE II

The procedure of Example I was substantially repeated, but using a pond contaminated with 7 ppm chlorobenzene, 7 ppm toluene, and 10 ppm lead (as lead nitrate). At the end of Day 7 (measured from the time of inoculation) a sample of the pond water was withdrawn, clarified by centrifugation, and fractionated by High Performance Liquid Chromatography, using a C-18 column (150 mm high×4 mm diam.). The HPLC fractions were analyzed by Liquid Chromatography-Mass Spectroscopy (LC-MS). The LC-MS spectral pattern revealed various biodegradation products of the aromatic compounds, including aliphatic compounds and bicarbonate ions. The pattern indicated that the biodegradation process included the cleaving of methyl and chloro groups from the benzene ring, the opening of the benzene ring, and the oxidation of some of the carbon atoms to carbon dioxide. The lead ions were precipitated in the biomass as lead sulfide, which is relatively non-toxic, in comparison to the lead nitrate starting material.

Figure 2:
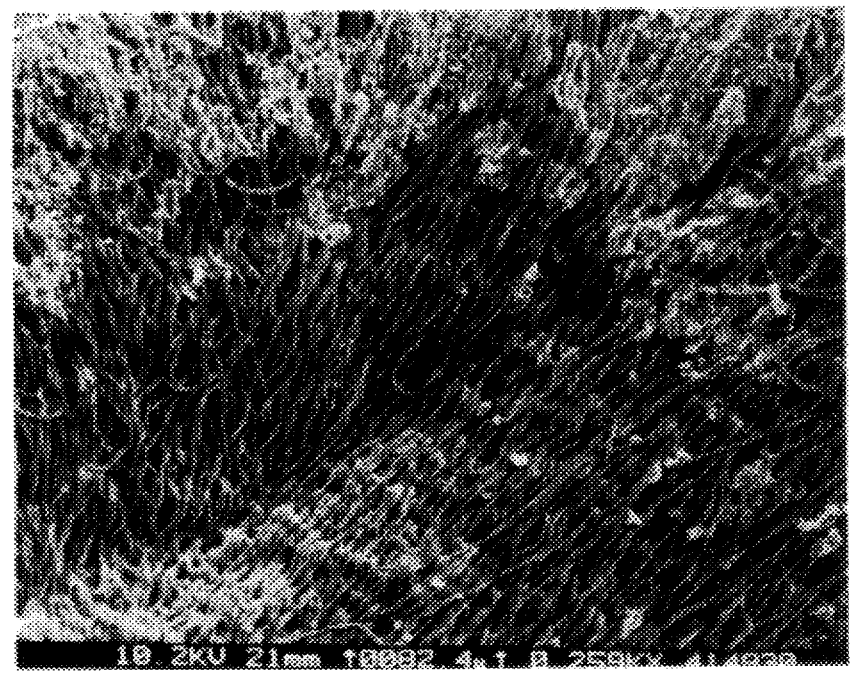

Samples of the silage and annealed bloom biomass from procedures performed as in Examples I and II were withdrawn at various intervals and examined by Scanning Electron Microscopy (SEM) and are illustrated in FIGS. 1 and 2.

Protein Analysis

Studies have been performed to determine what cellular proteins produced by *Bacillus cereus* are responsible for the enzymatic process by which the bacteria are able to reduce the heavy metals to their less toxic states that can be removed with the biomass from the pond's surface in the process of the present invention. Unique metal-binding proteins were found in the cell fractions (membrane and cytosol) of the *Bacillus cereus*, as well as in the spent culture media, after culture of the bacterium in a media containing a conglomerate mixture of arsenic, hexavalent chromium, and lead compounds. These were examined by polyacrylamide gel electrophoresis (PAGE) on 4–20% linear gradient gels (Biorad). The amino acid sequences of the two metal-binding proteins (MBP-1 and MBP-2) were found to be as follows:

MBP-1: T D Q N T D H A Q L V A G D H N Y S D

The representative amino acids are:

Thr-Asp-Gln-Asn-Thr-Asp-His-Ala-Gln-Leu-Val-Ala-Gly-Asp

MBP-2: S T L N I N D I X X H A D V X A X X G

The representative amino acids are:

Ser-Thr-Lue-Asn-Ile-X-X-His-Ala-Asp-Val-X-Ala-X-X-Gly (Each -X- indicates an unidentified amino acid.)

Both proteins revealed a sequential heterogeneity in the amino acids.

I contemplate isolating the gene or genes that code for the above proteins and then cloning the genes and biomanufacturing each protein in quantity. Then one or both of the proteins may be placed on a substrate, for example a packed column, and contaminated water can be detoxified by contacting it with the supported protein.

I claim:

1. A process of remediating the chemical contamination of a pond that is contaminated with one or more contaminants selected from the group consisting of toxic heavy metals and one or more aromatic compounds, comprising the following steps:

a) preparing a silage of grass clippings;

b) placing the silage on the surface of the pond and inoculating the pond with an alga and *Bacillus cereus*, using sufficient amounts of said alga and *Bacillus cereus* to cause a mixed algal and bacterial bloom to form on the pond surface and become annealed to the silage;

c) leaving said silage with annealed bloom on the surface of the pond for a time sufficient to allow the bloom to withdraw at least some of the toxic heavy metal content of the pond or for a time sufficient to allow the microorganisms in the bloom to degrade at least some of the aromatic compound content of the pond; and d) then removing said silage with annealed bloom from the pond.

2. The process of claim 1 wherein the alga is a blue-green alga.

3. The process of claim 2 wherein, in step (a), the silage is prepared by storing the grass clippings under substantially anaerobic conditions for a period of at least about 2 weeks at a temperature in the range of about 25° to 30° C., and then cooling the silage to a temperature at or below about 4° C. but above freezing.

4. The process of claim 3 wherein the grass clippings used in step (a) are in admixture with sugar cane stalk.

5. The process of claim 4 wherein the pond is contaminated with one or more toxic heavy metals and one or more aromatic compounds, and wherein in step (c) the silage with annealed bloom is left on the surface of the pond for a time sufficient to allow both (i) the bloom to withdraw at least some of the toxic heavy metal content of the pond and (ii) the microorganisms in the bloom to degrade at least some of the aromatic compound content of the pond to aliphatic derivatives.

6. The process of claim 5 wherein, in step (a), the grass clippings contain Bermuda grass and Kentucky fescue.

7. The process of claim 6 wherein the grass clippings additionally contain other wild grasses.

8. The process of claim 5 wherein the silage prepared in step (a) contains lactic acid, propionic acid, and acetic acid.

9. The process of claim 8 wherein, in step (c), the silage is left on the pond for at least about 14 days.

10. The process of claim 9 wherein the silage is removed from the pond within about 30 days after being placed thereon.

11. The process of claim 10 wherein, in step (b), a sufficient amount of *Bacillus cereus* is used to cause a bacterial bloom to form on the pond within about 24 hours after inoculation.

12. The process of claim 11 wherein the pond is contaminated with one or more metals selected from the group consisting of arsenic, hexavalent chromium, lead, selenium, and cadmium.

13. The process of claim 12 wherein the pond is contaminated with one or more aromatic compounds selected from the group consisting of chlorobenzene, toluene, and nitrobenzene.

14. The process of claim 13 wherein, in step (a), the grass clippings contain Bermuda grass and Kentucky fescue.

15. The process of claim 14 wherein the grass clippings additionally contain other wild grasses.

16. The process of claim 15 wherein the silage is prepared by mixing two or more ensilages of said grass clippings and sugar cane stalk, at least two of said ensilages having undergone ensilaging times that differ by at least about 3 days.

17. The process of claim 14 wherein the silage is prepared by mixing two or more ensilages of said grass clippings and sugar cane stalk, at least two of said ensilages having undergone ensilaging times that differ by at least about 3 days.

18. The process of claim 5 wherein, in step (b), a sufficient amount of *Bacillus cereus* is used to cause a bacterial bloom to form on the pond within about 24 hours after inoculation.

19. The process of claim 1 wherein the pond is contaminated with one or more metals selected from the group consisting of arsenic, hexavalent chromium, lead, selenium, and cadmium.

20. The process of claim 19 wherein the pond is contaminated with one or more aromatic compounds selected from the group consisting of chlorobenzene, toluene, and nitrobenzene.

21. The process of claim 1 wherein, in step (b), a sufficient amount of *Bacillus cereus* is used to cause a bacterial bloom to form on the pond within about 24 hours after inoculation.

* * * * *